Patented Feb. 27, 1945

2,370,341

UNITED STATES PATENT OFFICE 2,370,341

PIGMENTED COATING COMPOSITIONS

Harold E. Woodward, Penns Grove, N. J., assignor to E. I. du Pont de Nemours & Company, Wilmington, Del., a corporation of Delaware No Drawing. Application July 28, 1943,
Serial No. 496,485

4 Claims. (Cl. 106—28)

This invention relates to red pigmented coating compositions, such as lithographic inks, paints and lacquers, which comprise a film forming composition or vehicle pigmented with an azo pigment which is made by coupling the diazo of 2-amino-6-chloro-toluene and the anilide of 2-hydroxy-3-naphthoic acid.

Heretofore red pigmented coating compositions have been pigmented with a monazo compound made by coupling the diazo of 3-nitro-4-amino-toluene with beta naphthol. The coating compositions pigmented with this pigment or its lakes have good properties in general, but the brightness and strength of shade of the compositions are not as good as are desired. Insoluble azo compounds which are capable of being incorporated into film forming compositions have also been made by coupling the diazo of 4-chloro-2-amino-toluene with the anilide of 2-hydroxy-3-naphthoic acid and by coupling the diazo of 5-chloro-2-amino-toluene with the same anilide, but the pigmented coatings made with these pigments have poor light fastness and they bleed excessively. Still other monazo compounds in which the diazo of 6-chloro-2-amino-toluene is coupled in combination with cotton fibers and with other kinds of arylamides, forming dyeings thereon have been reported. In such azo combinations, the anilide of acetoacetic acid or the anilide of furoylacetic acid was used as the coupling component. The dyeings made with these combinations on cotton are yellow shades.

It is among the objects of the present invention to provide new red pigmented coating compositions having good light fastness, non-bleeding and strength properties comprising a monazo compound made by coupling the diazo of 2-amino-6-chloro-toluene with the anilide of 2-hydroxy-3-naphthoic acid. Another object of the invention is to provide satisfactory coatings of compositions pigmented with an azo compound made from components which are readily abundant and are relatively inexpensive to manufacture. Another object of the invention is to provide processes for manufacturing the new compositions. Other objects of the invention will be apparent from the following description.

The objects of the invention are attained in general by providing a monazo compound made by coupling the diazo of 2-amino-6-chloro-toluene with the anilide of 2-hydroxy-3-naphthoic acid and incorporating the compound or a lake thereof in a film-forming composition comprising a nonvolatile film-forming vehicle, such as those used in making lithographic inks, paints and lacquers.

The invention will be more fully set forth in the following more detailed description which includes examples that are given as illustrative embodiments of the invention and not as limitations thereof. Parts are expressed in parts by weight unless otherwise noted.

Example 1

141.5 parts of 2-amino-6-chlor-toluene was dissolved in 800 parts of water at 80° with 40 parts of hydrochloric acid (100%). Then 50 parts of hydrochloric acid (100%) was added and the solution was iced to 0° C. Upon the gradual addition of a solution containing 69 parts of sodium nitrite, a clear solution of the diazonium compound was obtained. This was added to a solution prepared by dissolving 276 parts of the anilide of 2-hydroxy-3-naphthoic acid and 80 parts of sodium hydroxide in 2,000 parts of water at 60° C. and adding ice to bring the temperature down to 10° C. The temperature was kept below 15° C. during the coupling. When the coupling was finished, the batch was heated to 90° C. and filtered. The pigment was washed and dried. The product is represented by the formula 6-chloro-2-amino-toluene→2-hydroxy-3-naphthoic anilide, the coupling being in the ortho position to hydroxy.

Example 2

One part of the pigment prepared as described in Example 1 was dispersed in 3 parts of lithographic varnish by 2 passes of 50 times each on a Hoover automatic muller, an apparatus commonly used for grinding small batches of printing ink. The printing ink thus obtained was bright red, and was similar in shade to an ink prepared in like manner from Toluidine Toner, an important commercial red pigment made by diazotizing 3-nitro-4-amino-toluene and coupling with beta-naphthol (Colour Index No. 69).

Lithographic varnish is a well known preparation made by boiling linseed oil until it is thickened.

Two parts of the new ink were mixed with 25 parts of a printing ink similarly pigmented with zinc oxide. By comparison with a like mixture prepared by mixing the zinc oxide pigmented ink and an ink similarly pigmented with Toluidine Toner in the manner described, the tint of the mixture containing the 6-chloro-2-amino-toluene→2-hydroxy-3-naphthoic anilide was found to be yellower, brighter and stronger. The bleeding and fastness properties of the mixed inks made from the new pigment and from Toluidine Toner were otherwise similar, except that when baked at 150° C. (302° F.), the ink pigmented with the new pigment showed much less change in color.

*Example 3*

One hundred parts of the pigment prepared in accordance with Example 1 were ball milled for 24 hours in 469 parts of a 52% linseed oil modified glycerol phthalate and 161 parts of an aromatic solvent thinner, using 2,500 parts of steel balls in the mill. Then 1,030 parts of a hydrocarbon solvent comprising 1 part of petroleum naphtha and 2 parts of mineral spirit were added and ball milling was continued for 1 hour until a homogeneous mixture resulted. The paint thus obtained was sprayed onto a panel of sheet steel. No noticeable change in the coating was observed after the painted panel had been exposed to the weather for several months.

When the paint made in accordance with the invention was mixed with white paint, it gave a stronger and yellower tint than an equal amount of another paint similarly made except that the other paint was similarly pigmented with Toluidine Toner.

Similar results are obtained with other paints pigmented with the new pigment, such as paints containing natural drying oils such as tung oil and perilla oil with volatile and polymerizable constituents.

*Example 4*

One hundred parts of the pigment prepared in accordance with Example 1 were ball milled for 24 hours with 800 parts of an alcohol-ester solution of a urea-formaldehyde resin, 80 parts of dibutyl phthalate, 40 parts of blown castor oil and 580 parts of an alcohol-ester solvent, using 6,000 parts of steel balls in the mill. The alcohol-ester solvent was composed of butyl acetate, low boiling petroleum hydrocarbons, methyl ethyl ketone, butyl and ethyl alcohol. Then a mixture composed of 250 parts of nitrated cellulose (having a nitrogen content of about 12% and a viscosity characteristic of about 3 seconds in accordance with A. S. T. M. specification D301–33, formula C) 250 parts of nitrated cellulose (having a like nitrogen content and viscosity characteristic in accordance with the same A. S. T. M. specification, formula B) and 1,500 parts of the said alcohol-ester solvent were added and the batch was ball milled one hour longer.

This lacquer was sprayed onto a panel of sheet steel, which was then exposed to the weather for several months without any noticeable change. As compared to a similarly prepared lacquer, except that an equal weight of Toluidine Toner was used as the pigment, the sprayed panel was a brighter red. When the new lacquer was mixed with an equal weight of a white lacquer (prepared in the same way as the lacquer prepared in accordance with the invention, except that 100 parts of a white antimony oxide pigment was used instead of the red pigment) the mixture gave a mixture having a stronger, yellower and brighter tint than a similar mixture made with the white lacquer and the Toluidine Toner lacquer herein described. When a stripe of white lacquer was painted over the described lacquered panels, both the new lacquer and the lacquer pigmented with Toluidine Toner showed a slight reddish bleed.

Similar results are obtained with other coating compositions containing a wide variety of volatile solvents and non-volatile film forming vehicles, such as rosin, dammar, phenolic, alkyd and coumarone-indene resins.

*Example 5*

The process described in Example 1 was modified by adding 20 to 40 parts of a surface-active agent, such as para soap, rosin, isopropylated naphthalene sulfonic acid or dinaphthyl-methane-disulfonic acid to the anilide of 2-hydroxy-3-naphthoic acid before coupling. The tinctorial properties of the pigment were slightly improved in that the masstone was lighter or cleaner and the tint was bluer or brighter, as shown by mixtures and tests similar to those hereinbefore described.

*Example 6*

When the process described in Example 1 was modified by adding 168 parts of sodium bicarbonate or 110 parts of ammonium chloride to the solution of the anilide of 2-hydroxy-3-naphthoic acid in sodium hydroxide and coupling at 35° C. instead of at 15° C., the resulting pigment had a much bluer tint as shown by comparative tests.

*Example 7*

A solution of the diazonium compound was prepared as described in Example 1. The coupling component was prepared by dissolving 263 parts of the anilide of 2-hydroxy-3-naphthoic acid in 2,000 parts of water at 60° C. with 80 parts of sodium hydroxide (100%) and 272 parts of sodium acetate crystals, and then adding 75 parts of hydrochloric acid (100%) to give a slurry slightly acid to litmus. The solution of the diazonium compound was added to the solution of coupling component as rapidly as it would couple. The coupling temperature was kept at 60° C. About 1 hour was required for the coupling. When the coupling was finished the slurry was made slightly alkaline with sodium hydroxide and filtered at 90° C. After washing, the pigment was dried at 70° C.

*Example 8*

The pigment prepared in accordance with the process of Example 7 was used for coloring an ink, a paint and a lacquer as described in Examples 2, 3 and 4. The products were lighter in masstone and bluer in tint than similar products made with the pigment of Example 1, but they were practically equal in bleeding and fastness properties. They were bluer than similar products colored with Toluidine Toner.

*Example 9*

When the process described in Example 7 was modified, by adding 20 parts of the surface active agent, isopropylated naphthalene sulfonic acid, to the solution of the anilide of 2-hydroxy-3-naphthoic acid before precipitating it with hydrochloric acid and the pigment thus produced was used to make an ink otherwise like that described in Example 2, the ink was bluer than the ink produced in accordance with Example 2. Appreciable variations in the tinctorial properties were also obtained by the use of other surface active agents and by varying the method of precipitating the anilide of 2-hydroxy-3-naphthoic acid.

*Example 10*

A pigment was made as described in Example 1 except that it was not dried after it was washed. The filtered and washed pigment (1 part) was slurried with 30 parts of water. This slurry was then mixed with a slurry of aluminum hydrate to form a lake. The slurry of aluminum hydrate was made by slowly adding a solution composed of 1 part of sodium carbonate dissolved in 10 parts of water to a solution composed of 2 parts of aluminum sulfate dissolved in 20 parts of water at 100° C., then washing the resulting precipitate free of sulfates, and finally suspending the precipitate in 40 parts of cold water. This red lake was filtered, washed and dried. When this laked color was used to make lacquer as described in Example 4, instead of the pigment described therein, and the lacquer was sprayed on metal, it gave a coating having a lighter and brighter color than a similar lacquer in which an equal proportion of Toluidine Toner was used as the pigment. The tinting strength of these lacquers was about equal.

*Example 11*

Another lake was made from a slurry composed of 1 part of the new undried pigment in 30 parts of water. The lake was made by mixing this slurry with a mixture containing 0.66 part of rosin dissolved in a mixture of 0.34 part of ammonium hydroxide, in 10 parts of water (heated to boiling) and a 10% water solution containing 0.33 part of barium chloride crystals. The lake was formed by heating the mixture to boiling. The lake was finally filtered from the medium, washed free of chlorides and dried. A lacquer was made in accordance with the process described in Example 4, except that 100 parts of this laked color were used instead of the pigment described therein. The lacquer was sprayed on metal and it gave a coating having properties similar to the coating described in Example 10.

The term, protective coating composition, as used in the specification and claims refers to fluid compositions which contain a vehicle, such as a liquid or liquefied non-volatile film-forming vehicle and the pigment, and which are capable of forming durable non-liquid or hardened coatings on solid materials upon which they are superimposed, such as paper, wood, aluminum, brass, steel and other metallic and organic solid materials. The objects of the invention are attained by all such compositions in which the durable coating is formed by volatilization of a solvent from the liquid or by the hardening of a constituent of the liquid by polymerization or oxidation, or by a combination of these and similar effects. Any of the many modifying agents used in such protective coating compositions may be present, such as other pigments, plasticizers, accelerators, retardants or laking substrata. The specific amounts of pigment, vehicle and thinner set forth in the specific examples are illustrative and are capable of wide variation in order to obtain changes in degree of pigmentation.

Numerous modifications of the invention can be made, such as modifications effected by the pH value and temperature relations of the coupling medium in which the pigment is formed. Still other modifications can be made without departing from the spirit and scope of the invention and it is to be understood that the invention is not restricted to the specific illustrations thereof herein set forth.

I claim:

1. A pigmented protective coating composition comprising a non-volatile film forming vehicle and a pigment which is the product of coupling the diazo of 6-chloro-2-amino-toluene with the anilide of 2-hydroxy-3-naphthoic acid.

2. A pigmented printing ink comprising lithographic varnish and a pigment which is the product of coupling the diazo of 6-chloro-2-amino-toluene with the anilide of 2-hydroxy-3-naphthoic acid.

3. A paint comprising a drying oil, a thinner and a colored pigment which is the product of coupling the diazo of 6-chloro-2-amino-toluene with the anilide of 2-hydroxy-3-naphthoic acid.

4. A lacquer comprising a lacquer resin, a volatile thinner and a colored pigment which is the product of coupling the diazo of 6-chloro-2-amino-toluene with the anilide of 2-hydroxy-3-naphthoic acid.

HAROLD E. WOODWARD.